E. G. ADAMS.
TRACTION GEAR.
APPLICATION FILED AUG. 26, 1913.
1,118,835.
Patented Nov. 24, 1914.
2 SHEETS—SHEET 2
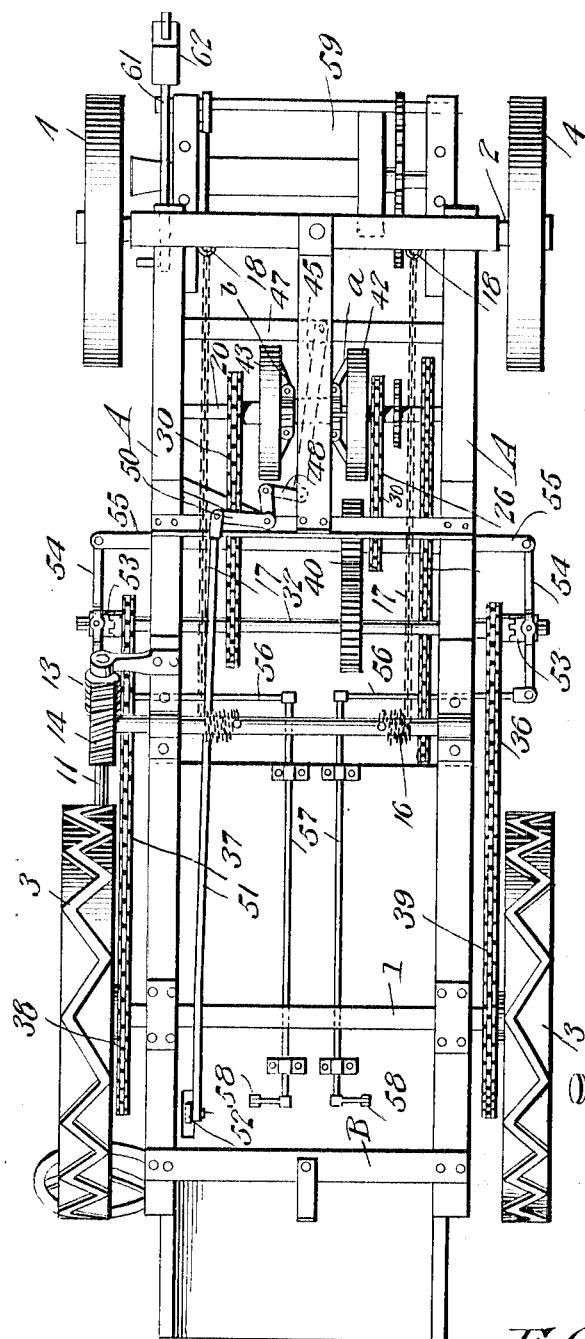
Witnesses
Fl. Ackman Jr.
P. M. Smith.
Inventor
E. G. Adams
By Victor J. Evans
Attorney

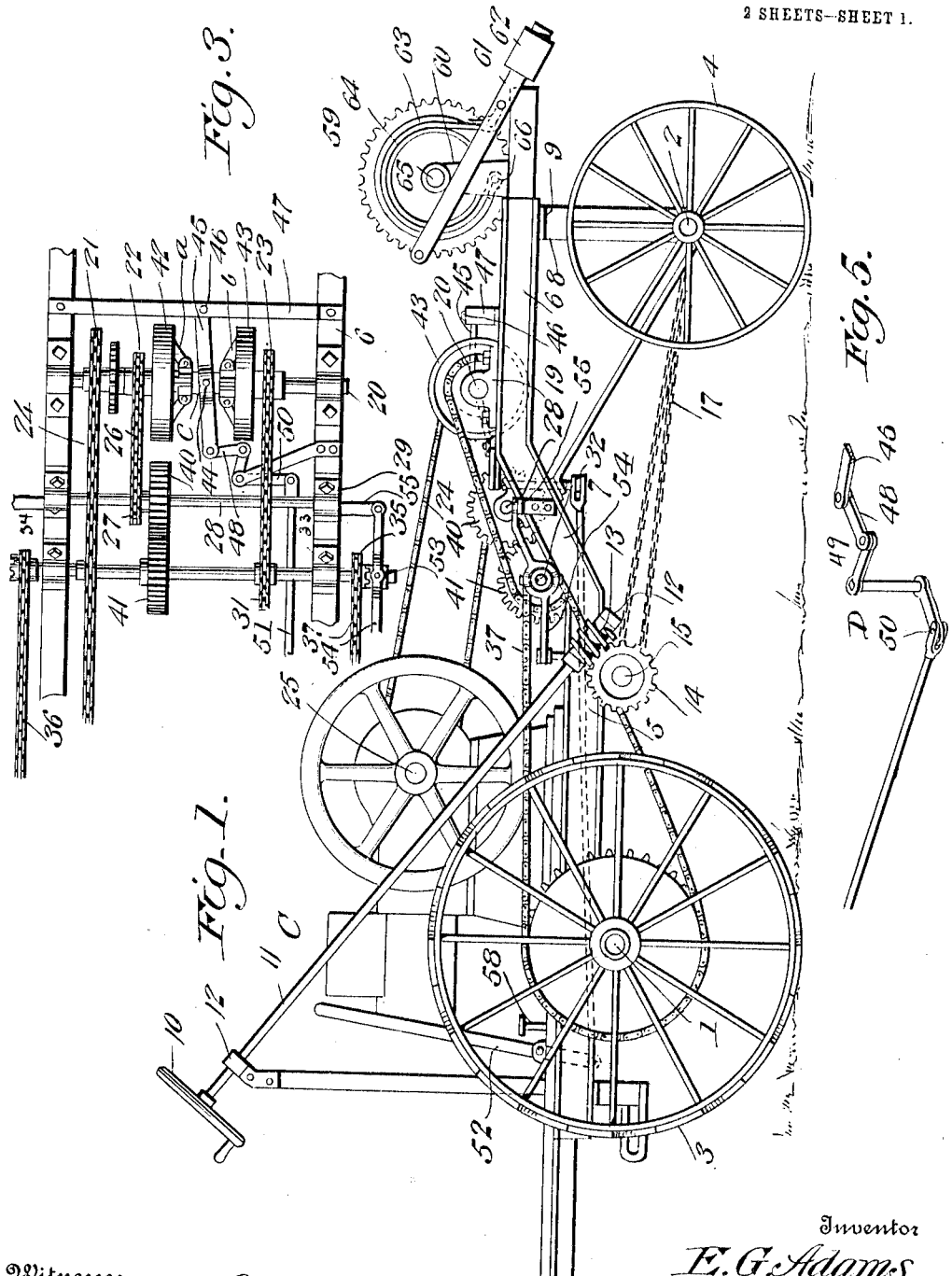

UNITED STATES PATENT OFFICE.

EDWIN G. ADAMS, OF MARYSVILLE, OHIO.

TRACTION-GEAR.

1,118,835.     Specification of Letters Patent.     Patented Nov. 24, 1914.

Application filed August 26, 1913. Serial No. 786,759.

*To all whom it may concern:*

Be it known that I, EDWIN G. ADAMS, a citizen of the United States, residing at Marysville, in the county of Union and State of Ohio, have invented new and useful Improvements in Traction-Gears, of which the following is a specification.

This invention relates to traction gears, the object of the invention being to produce a motor truck or chassis adapted for use in combination with any of the present day types of internal combustion motors of the reciprocatory class, the gear or truck embodying a frame of special construction having combined therewith driving and steering mechanisms which will admit of the driving of the machine in a forward or reverse direction and also admit of the accurate steering of the machine under all conditions.

One of the chief aims of the present invention is to so construct the frame and arrange the transmission gearing that ample clearance will be provided for the driving connection between the propelling engine and the shafts of said transmission gearing, thus enabling any of the present day types of engines to be mounted on the frame of the truck and coupled with said gearing. This produces what may be termed a universal traction gear or truck which may be equipped at the factory or by the user with an internal combustion engine of any ordinary type now in common use.

With the above and other objects in view, the invention consists in the construction, combination and arrangement of parts, as will hereinafter be more fully described, illustrated and claimed.

In the accompanying drawings: Figure 1 is a side elevation of a traction gear embodying the present invention. Fig. 2 is a bottom plan view of the same. Fig. 3 is a partial top plan view of the gear or truck, showing the clutch mechanism and reversing mechanism together with the parts intimately associated therewith. Figs. 4 and 5 are detail perspective views illustrating the clutch operating connections.

Referring to the drawings 1 designates the rear axle, 2 the front axle, 3 the traction driving wheels and 4 the front steering wheels.

The frame of the gear or truck comprises the substantially parallel side bars A and any number of connecting cross bars B, the bars A and B being rigidly connected together and the side bars A comprising the relatively low rear portions 5, the elevated forward portions 6 and the intermediate offset and oblique portions 7. Each of the said side bars is preferably formed of I-beam as indicated in Fig. 1 and is continuous from end to end, being bent or offset intermediate the ends thereof for the purpose of locating the forward portion of the frame in a higher plane than the rear portion thereof.

The rear portion of the frame is supported directly on the rear axle 1 while the forward portion of the frame is supported at the desired elevation by means of a front bolster 8. This bolster is substantially V-shaped and provided at the top with flanges 9 which are bolted to the main frame, the axle 2 being pivotally connected at its center to the bottom or narrower portion of the bolster 8 so that said axle 2 is adapted to turn in a horizontal direction when it is desired to steer the machine to one side or the other.

The steering of the machine is effected by means of a hand wheel 10 on the upper and rear end of an inclined steering shaft 11 journaled in suitable bearings 12, said shaft being provided adjacent to its forward lower end with a worm 13 which meshes with a worm wheel 14 fast on a transverse shaft 15 journaled in suitable bearings under the side frame bars A. The shaft 15 is provided with chain drums 16 in spaced relation to each other from which chains 17 extend forward to the front axle 2 to which they are connected at 18. The chains 17 are wrapped in opposite directions around the drums 16, one chain passing over its drum while the other chain passes under its drum. Therefore when the shaft 15 is turned in one direction by means of the hand wheel 10, one chain 17 is wound upon its drum while the other is allowed to unwind from its drum.

Mounted in bearings 19 on the elevated front portion of the frame is a clutch shaft 20 having fast thereon a sprocket wheel 21 and loose sprocket wheels 22 and 23. A chain 24 extends from the sprocket wheel 21 to a sprocket wheel (not shown) on the crank shaft 25 of an engine shown conventionally and generally represented by the reference character C. This engine may, as previously indicated, be of any of the types now in common use.

From the sprocket wheel 22 a chain 26 extends around a sprocket wheel 27 on a reversing shaft 28 parallel to the clutch shaft 20 and journaled in bearings 29 on the inclined or oblique portions 7 of the side bars A, thus locating the reversing shaft in a lower plane than the clutch shaft.

From the sprocket wheel 23 a chain 30 extends to a sprocket wheel 31 on a countershaft 32. This countershaft is journaled in bearings 33 located on a lower portion of the machine frame and is provided adjacent to its opposite ends with sprocket wheels 34 and 35 from which drive chains 36 and 37 extend rearwardly around larger sprocket wheels 38 and 39 on the rear driving wheels 3.

The shaft 32 is located in a lower plane than the shaft 28 and the shaft 28 is located in a lower plane than the clutch shaft 20. This enables the chain 24 from the engine shaft to clear both of the shafts 28 and 32 and it is on this account that various makes of engines may be used in connection with the gear or truck, the engine being mounted on the rear portion of the frame and preferably directly over the rear axle 1. The shafts 28 and 32 are geared together by spur gear wheels 40 and 41 as shown in Fig. 3 so that one shaft is driven in the reverse direction from the other.

Mounted loosely on the clutch shaft 20 are two clutch drums 42 and 43 arranged in spaced relation to each other and having fast on the hubs thereof the sprocket wheels 22 and 23 above referred to. It will thus be seen that the drum 42 is geared to and actuates the shaft 28 while the drum 43 is geared to and actuates the shaft 32.

Operating between the drums 42 and 43 is a clutch embodying the clutch members $a$ which operate in conjunction with the drum 42 and the clutch members $b$ which coöperate with the drum 43. Both sets of clutch members $a$ and $b$ are carried by a common connecting sleeve or collar $c$ which is slidable on the clutch shaft 20 and which has a jointed connection at 44 with a clutch shifting lever 45. This lever is pivotally connected at 46 to a cross bar 47 of the frame and has pivotally attached to its opposite end a link 48 which is connected pivotally to one arm 49 of a bell crank lever D, said lever being pivotally connected at 50 to a rod 51 the opposite end of which is pivotally connected to a hand lever 52 arranged within convenient reach of the operator who may at one and the same time operate the lever 52 and the hand wheel 10.

On the opposite ends of the shaft 32 positive clutches 53 are mounted, said clutches being operated by levers 54 fulcrumed on brackets 55 on the machine frame. The levers 54 are connected by rods 56 to crank arms on rock shafts 57 connected at their rear ends to depressible foot treadles 58 arranged within reach of the driver's feet. The driver by pressing on one of said levers may disconnect the driving chain 36 at that side of the machine, leaving the other chain at the opposite side in working condition.

The forward portion of the frame forms a convenient support for various devices such, for example, as a hoist or windlass 59, such windlass being shown as journaled in suitable bearing brackets 60 fastened rigidly to the frame. 61 designates a brake arm weighted as shown at 62 and controlling a brake band 63 which encircles a brake drum 64 on the shaft 65 of the windlass, one end of the brake band 63 being attached to the brake arm 61 and the opposite end thereof being fixedly connected at 66 to a convenient part of the frame or to one of the brackets 60.

By means of the construction hereinabove described a practically universal traction gear or motor truck is provided especially adapted for the use of the farmer for the purpose of drawing plows and agricultural machinery in general while in operation in the field, also for moving said machinery from place to place. The gear or truck is, as previously indicated, adapted to receive any of the present day types of internal combustion engines and on account of the form of the frame and the arrangement of the gearing rendered possible by said form of the frame, ample clearance is afforded for the chain drive between the engine shaft and said gearing. There are no gears to strip, it being necessary only to shift from one clutch drum to the other in order to bring about a forward or backward movement of the machine. Various mechanisms may be mounted on the frame such as the hoist or windlass above described and if desired a platform may be added for a spraying outfit, saw frame, post-driver, well digger and various other attachments.

What is claimed is:

The herein described traction gear embodying a rear driving axle, driving wheels thereon, a front steering axle, wheels thereon, a front bolster to which the front axle is centrally pivoted, a truck frame supported on the rear axle and front bolster and comprising side bars and connecting cross bars, the side bars being offset between their ends to locate the front part of the truck frame in a higher plane than the rear part thereof, a motor bed on the depressed part of said frame, a clutch shaft journaled on the elevated part of said frame, a countershaft journaled on a lower part of said frame and operatively connected to the rear driving wheels, a reversing shaft journaled on said frame in a higher plane than the countershaft and in a lower plane than the clutch shaft, and manually controlled gearing between the clutch shaft and the countershaft and reversing shaft.

In testimony whereof I affix my signature in presence of two witnesses.

EDWIN G. ADAMS.

Witnesses:
L. L. BARKER,
F. Z. BALLINGER.

Copies of this patent may be obtained for five cents each, by addressing the "Commissioner of Patents Washington, D. C."